May 23, 1944. G. L. LARISON 2,349,289
VEHICLE WHEEL MOUNTING
Filed March 12, 1943 4 Sheets-Sheet 1

GLENN L. LARISON
INVENTOR

BY Geisler and Geisler
ATTORNEYS

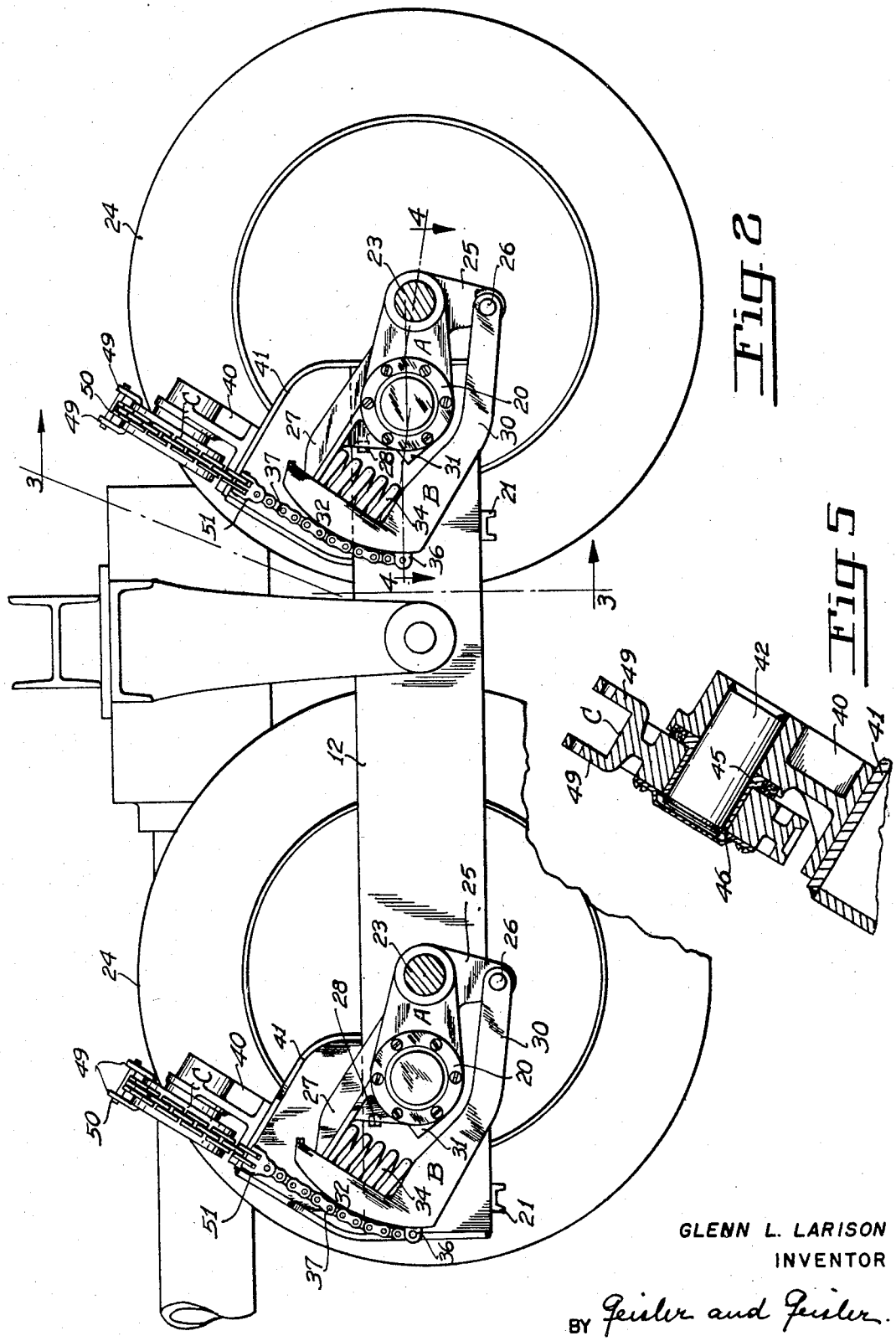

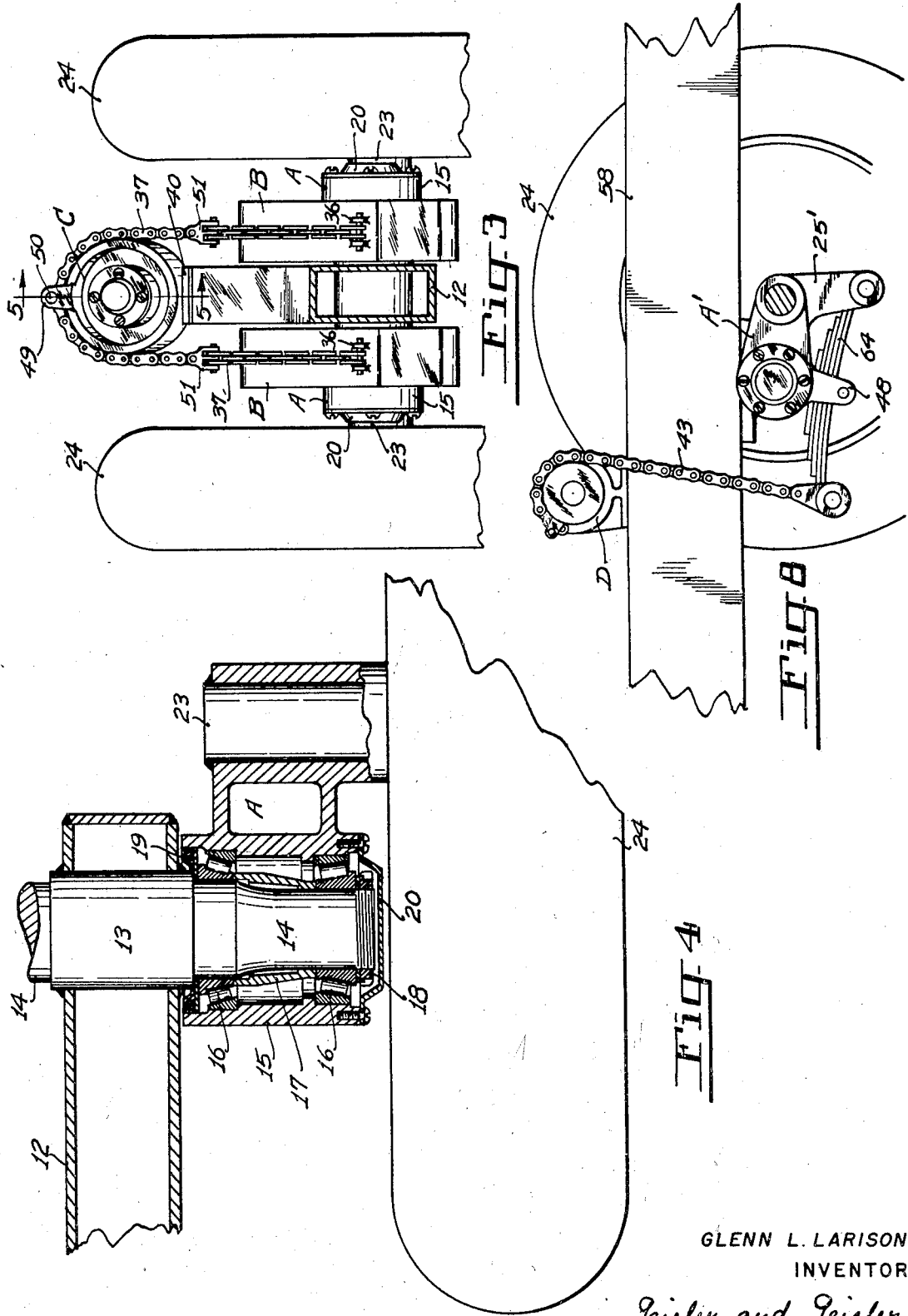

May 23, 1944.  G. L. LARISON  2,349,289
VEHICLE WHEEL MOUNTING
Filed March 12, 1943  4 Sheets-Sheet 4
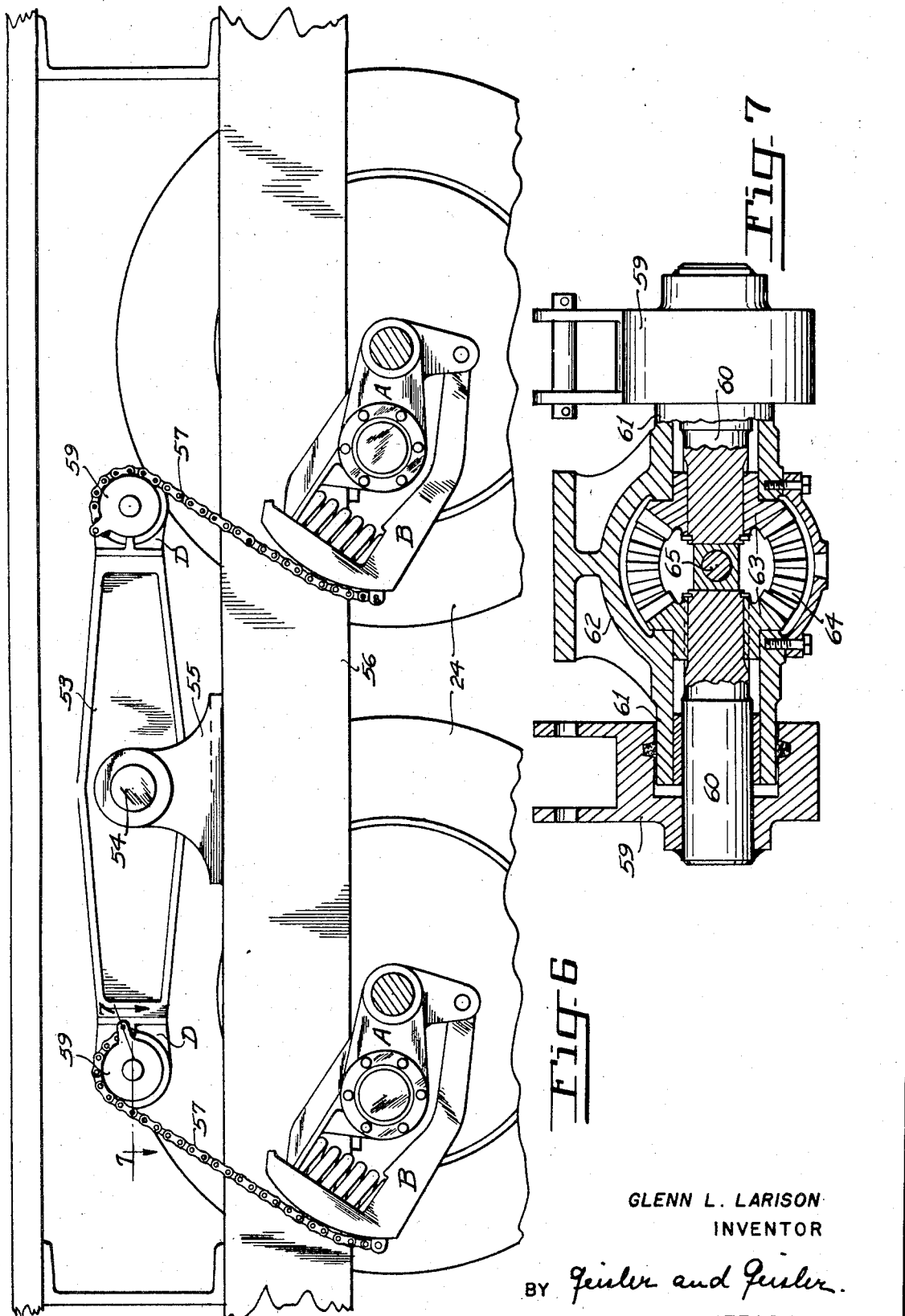
GLENN L. LARISON
INVENTOR
BY *Geisler and Geisler*
ATTORNEYS Patented May 23, 1944

2,349,289

UNITED STATES PATENT OFFICE 2,349,289

VEHICLE WHEEL MOUNTING

Glenn L. Larison, La Grande, Oreg., assignor to Larison Compensating Axle Corporation, a corporation of Oregon Application March 12, 1943, Serial No. 478,867

6 Claims. (Cl. 280—124)

REISSUED
JAN 22 1946

This invention relates to mountings for vehicle wheels in which the wheels are arranged in pairs, with the wheels of each pair placed a short distance apart transversely and mounted so that they may roll independently of each other and also so that each wheel may be raised above or dropped below the level of the other, but with the wheels of the pair so connected by compensating mechanism that each wheel will at all times carry its share of the load.

More particularly, this invention relates to the type of compensating wheel mounting described in my U. S. Letters Patent No. 2,226,100 issued under date of December 24, 1940, entitled Vehicle wheel mounting; and the present invention embodies certain modifications, simplification, and improvements in the structure of my previous patent.

In the wheel mounting and associated compensating mechanism described in my above mentioned patent the wheel spindles are mounted on hinged wheel-carrying arms, the free ends of which are connected respectively to ends of longitudinally-extending, pivotally-mounted leaf springs located above, but in the same planes as, the wheel-carrying arms, and the other ends of the longitudinally-extending springs are so connected as to cause them to move up and down in opposite directions. While these longitudinally-extending spring members are satisfactory in providing a shock reducing medium in the compensating connection between the wheel-carrying arms of each pair, nevertheless the fact that each of these spring members must be pivotally and separately mounted necessitates extra bearings requiring lubrication in the vehicle suspension. Also when these members are spaced above the corresponding wheel-carrying arms they take up some space which might be utilized advantageously for brake mechanism or for other purposes.

The object of this invention is to dispense with the necessity of having a separate pivotal mounting on the vehicle frame or walking-beam for such spring members, and also to substitute a somewhat simpler means of interconnecting the wheel-carrying arms of each pair in which provision will still be made for cushioning and reducing sudden shocks received from either or both wheels.

The manner in which this object is carried out will be apparent from the following description in which reference is made to the accompanying drawings.

In the drawings:

Fig. 2 is a fragmentary side elevation of an eight-wheeled trailer vehicle, with the two wheels on the near side removed, illustrating how the same wheel mounting may be employed in combination with an ordinary "walking beam";

Fig. 3 is a sectional end elevation of one of the pair of wheel mountings of Fig. 2, corresponding to the line 3—3 of Fig. 2;

Fig. 4 is a sectional plan view corresponding to the line 4—4 of Fig. 2;

Fig. 5 is a section on the line 5—5 of Fig. 3;

Fig. 6 is a fragmentary side elevation of an eight-wheeled vehicle, with the two wheels on the near side removed, illustrating a slightly different manner of employing my wheel mounting;

Fig. 7 is a section on the line 7—7 of Fig. 6; and

Fig. 8 is a side elevation, with one of the wheels removed, of a modified form of my invention.

Figure 1:
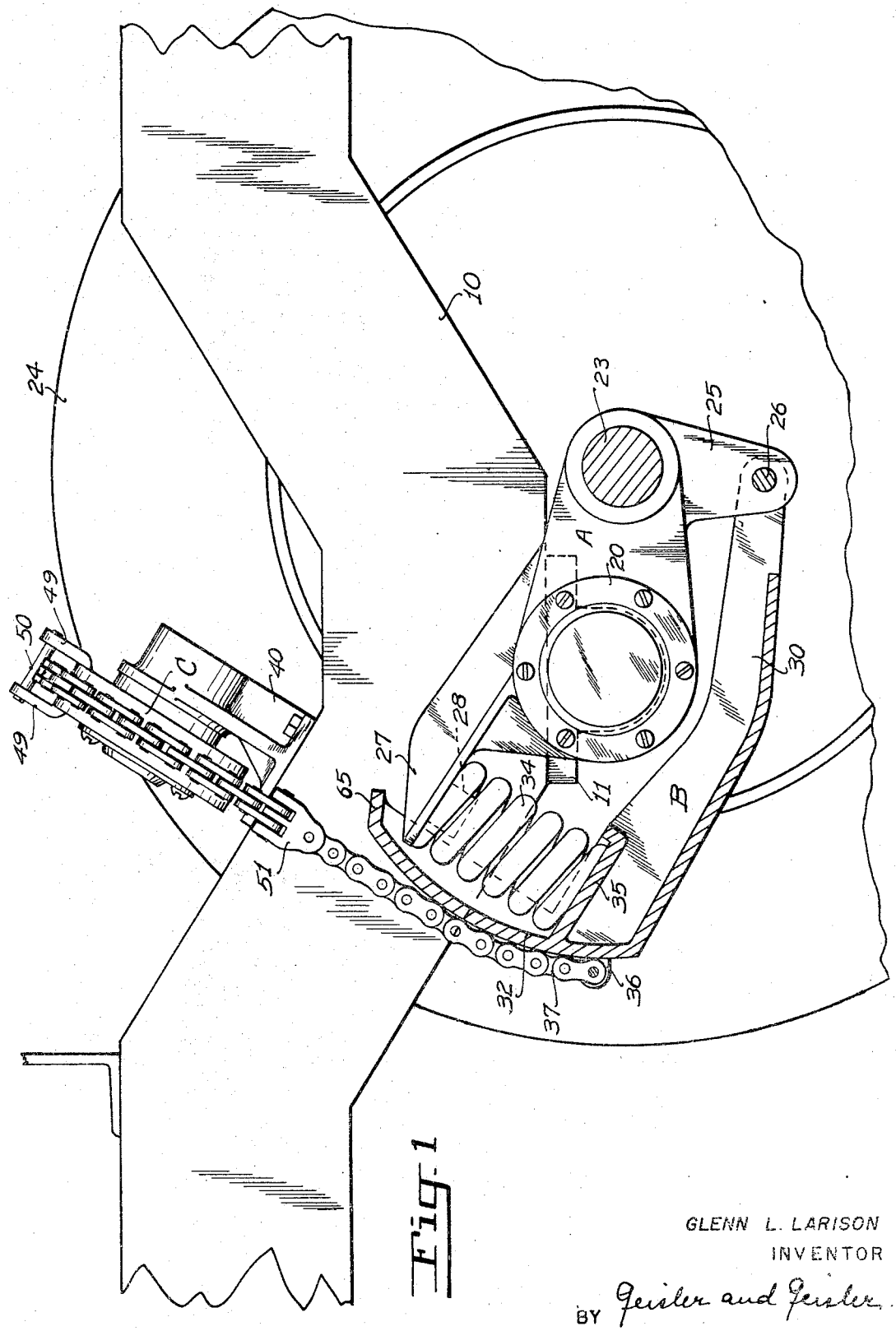
Fig. 1 is a side elevation of a portion of a vehicle frame showing my mounting for a pair of wheels attached directly to the vehicle frame, the outside wheel and wheel spindle having been removed for the sake of clarity.

Referring first to Figs. 1 to 5 inclusive, each wheel spindle 23 is supported on a pivotally-mounted wheel-carrying assembly A, which, in the vehicle shown in Fig. 1, is pivoted on a shaft mounted in a bearing bracket 11 secured to the vehicle frame 10, or which, in the vehicle shown in Fig. 2, may be pivoted on a shaft mounted in the walking-beam 12. It will suffice to describe the pivotal mounting of each pair of wheel-carrying assemblies on the walking-beam 12 and this will be seen clearly in Fig. 4. A suspension shaft 13 extends transversely through the walking-beam 12 and is secured therein, for example, by welding. Each end of the shaft 13 is reduced as shown at 14 and a wheel-carrying assembly A is rotatably mounted thereon. The hub 15 of assembly A houses a pair of antifriction bearings 16 which are suitably spaced by a spacer 17, and are held in place by a lock nut 18. An oil seal 19 and an end plate 20 seal the housing and hold the lubricant therein. A wheel spindle 23 is securely mounted in the pivoted wheel-carrying assembly A in any suitable manner, and a vehicle wheel 24 is journaled on the wheel spindle.

Each wheel-carrying assembly A (see Figs. 1 and 2) has an extending portion 25, preferably extending downwardly, to which an associated member or hanger arm B is pivotally connected by means of a pin 26. The shape and construction of the associated member or hanger arm B will be seen most clearly from Fig. 1. The main portion 30 is U-shaped in cross section and has a slight bend approximately at its center. The arm terminates in an arcuately formed drum section 32. A pair of lugs or ears 36 on the outside of the drum section provide a means of anchoring one end of a chain 37 thereto. The chain 37 passes over a compensating wheel C and its other end is attached to a corresponding and similar hanger arm (see Fig. 3) for the other wheel of the pair.

A lateral web 35, adjacent the drum section of the hanger arm, provides a pocket or seat for the bottom of a coil spring 34. A paw 27 extends from the hub of the wheel-carrying assembly A and engages the top of the coil spring 34. A lug 28 on the under side of the paw 27 holds the upper end of the coil spring 34 against lateral displacement.

The compensating wheel C is mounted on a supporting bracket 40 (see Figs. 1 and 3), which is secured to the frame 10 of the vehicle in the wheel suspension shown in Fig. 1, or which is secured to the top flange of an end plate 41 of the walking-beam 12 in the wheel suspension shown in Figs. 2 and 3. The wheel C is preferably inclined at such an angle that its axis will be perpendicular to a tangent from the central portion of the arcuate drum section of the member B. The compensating wheel and its mounting are shown more fully in Fig. 5. A stub shaft 42 is secured in the bracket 40. A shouldered bushing 45 is inserted in the bore of the wheel and is journaled on the shaft 42. A snap ring 46 retains the wheel on the shaft. The wheel has a pair of ears 49 and a pin 50 extends through these ears and engages a link of the chain 37. The chain 37 illustrated is of the cable type, and, since the arc of the drum section 32 of the member B and the perimeter of the compensating wheel lie in planes which are perpendicular to each other, a connecting link 51 is placed between the corresponding engaging portions of the chain 37.

An important feature of this construction is the fact that the outer contour of the drum section 32 of the member B is concentric about the axis on which the wheel-carrying assembly A pivots and thus the chain is restricted largely to longitudinal movement only, its geometrical position being such that its longitudinal movement will be in a line which is tangent to an arc of a circle of which the pivotal axis of the wheel-carrying assembly is the center.

From the description of my vehicle wheel mounting thus far it will be apparent that when one of the wheels of the pair is raised above the level of the other, causing the wheel-carrying assembly A to swing upwardly, the lower, pivotally-connected end of the member B also will move upwardly while the other or drum section end of the member B will be moved downwardly. This will cause the corresponding end of the chain 37 to be pulled downwardly. The downward pull of the chain on one side of the compensating wheel C will produce an upward pull of the chain on the other side with the result that the other associated member and wheel-carrying assembly will be moved oppositely and the other wheel of the pair will move downwardly. It will also be apparent that a sudden shock received by either wheel, for example when that wheel strikes a sudden bump in the road, will cause the spring 34 to be compressed, which will cushion the shock to the compensating mechanism and to the vehicle, and this will be true even if both wheels of the pair should strike the same bump simultaneously. Should the spring 34 become broken the associated member B would be caused to contact the hub of the wheel-carrying assembly A and would thereafter act as a rocking lever. The compensating mechanism would still function but there would be no cushioning of the shock in that half of the compensating mounting. Suitable stops should be provided (these are not shown) to limit the upward movement of the wheel-carrying assemblies in the event of the breaking of the chain 32 or of one of the members B. The upper end of the drum section 32 terminates in a lip 65 (Fig. 1) which engages the end of the paw 27 should the member B attempt to drop down too far in the event the chain 37 should break. It is desirable also to have a stop, such as that indicated at 21 in Fig. 2, to keep the member B from dropping down entirely in case the paw 27 as well as the chain 37 should become broken, thus enabling the vehicle to proceed on its way in spite of such breaks. When the vehicle is raised from the ground for any purpose, or when, for instance, this wheel mounting is used in an airplane landing gear, it may be desirable to prevent either wheel-carrying assembly from dropping down too far. For this purpose I provide a lug 31 (Fig. 2) on the hub of the wheel-carrying assembly A to engage a stop 28 when the wheel-carrying assembly swings down a certain distance, thus preventing further downward movement of the wheel-carrying assembly.

In Fig. 2 I have shown how my vehicle wheel mounting can be used with an ordinary walking-beam or equalizer in an eight-wheeled vehicle. However other equalizing means may also be employed in combination with my wheel mounting to equalize the load between two tandem pairs of wheels. In the vehicle illustrated in Fig. 6 a longitudinal rocker 53 has been substituted for the conventional walking-beam in accordance with the vehicle suspension described in my U. S. Letters Patent No. 2,284,665, issued under date of June 2, 1942, to which reference should be made.

In Fig. 6 the two pairs of wheel-carrying assemblies are pivotally mounted on suitable brackets attached to the vehicle frame 56. The longitudinal rocker 53 is pivoted on a shaft 54 in the bracket 55 also carried on the vehicle frame 56. Although a compensating wheel could be mounted on each end of the rocker 53 and the chains 57 be made to pass over these compensating wheels in the manner previously described, I prefer, in this construction, to substitute a differential unit D at each end of the rocker in place of the compensating wheels. Such a differential unit is shown more fully in Fig. 7.

Each differential unit comprises a housing 62 (Fig. 7), having hubs 61 within which the pair of alined shafts 60 are journaled. Bevel pinions 63, connected to the inner ends of the shafts 60, mesh with bevel gears 64 mounted on cross shafts 65, as in any ordinary differential. Sprocket wheels 59 are mounted on the outer ends of the shafts 60. The chains 57 are attached to the sprocket wheels 59, as shown in Fig. 6, the corresponding chains on the other half of each of the mountings for the pairs of wheels being similarly arranged. Due to the action of the differential D, when the chain on one sprocket wheel 59 is pulled down the sprocket wheel at the other side of the differential will act to pull the other corresponding chain upwardly. Thus the differential operates in the same way as the compensating wheel C of Figs. 1 and 2 to cause opposite movement between the two wheel-carrying assemblies of the pair of wheels. The use of a differential as an element of the compensating mechanism dispenses with the necessity of providing any special connecting links 51 (Fig. 1) in the chains. Obviously a differential might be substituted for the compensating wheel C in the construction shown in Fig. 1. My wheel mounting lends itself readily to other types of equalizing means which may be used to connect front and rear pairs of wheels in eight-wheeled vehicle suspension.

Fig. 8 shows a modification of my wheel mounting in which a resilient or leaf spring member is substituted for the hanger arm or associated member connected to the wheel-carrying assembly A'. In this modified construction the semi-elliptical leaf spring 64 is pivotally connected at one end to the downwardly extending portion 25' of the wheel-carrying assembly A'. The chain 43 is connected to the other end of the leaf spring 64. The chain 43 is attached to one of the sprocket wheels of the differential D supported on the vehicle frame 58. The spring 64 is clamped in a suitable cradle 48 secured to the hub of the wheel-carrying assembly A'. The spring 64 might be mounted above the wheel-carrying assembly in the same manner. However, I consider it preferable in this construction to have the associated spring member mounted below the wheel-carrying assembly.

Other modifications in the cushioning or shock-absorbing means and in the compensating mechanism employed as part of my wheel mounting could also be made within the scope of my invention.

I claim:

1. In a vehicle, a mounting for a pair of wheels including, a pair of wheel-carrying assemblies, said assemblies hinged at one end on said vehicle for up and down movement, the hinges of said wheel-carrying assemblies being in transverse alinement, said wheel-carrying assemblies extending in the same direction, each wheel-carrying assembly having a downwardly extending portion, an associated member located below each wheel-carrying assembly in the same vertical plane with the wheel-carrying assembly, one end of said associated member connected to the downwardly extending portion of the wheel-carrying assembly, the other end of the member extending beyond the hinge of its wheel-carrying assembly, intermediate means extending from the wheel-carrying assembly to its associated member, compensating mechanism connecting said other ends of associated members, whereby upward movement of one wheel-carrying assembly will cause a force in the opposite direction to be exerted on the other wheel-carrying assembly.

2. In a vehicle, a mounting for a pair of wheels including, a pair of wheel-carrying assemblies hinged at one end for up and down movement, an associated member located below each wheel-carrying assembly in the same vertical plane with the wheel-carrying assembly, one end of said associated member connected to the wheel-carrying assembly, the other end of the member extending beyond the hinge portion of the wheel-carrying assembly, compensating mechanism connecting said other extending ends of said members, a paw on each wheel-carrying assembly, a compression spring between said paw and the associated member, said paw and compression spring acting to keep the member normally spaced a predetermined distance below the hinge of the wheel-carrying assembly, whereby upward movement of a wheel-carrying assembly will cause opposite movement of the extending end of its associated member and any sudden upward movement of the wheel-carrying assembly will cause said spring to compress and cushion the shock while permitting the associated member to come closer to the hinge portion of the wheel-carrying assembly.

3. In a vehicle, a mounting for a pair of wheels including, a pair of wheel-carrying assemblies, said assemblies hinged for up and down movement, each wheel-carrying assembly having a downwardly extending portion, an associated member located below each wheel-carrying assembly in the same vertical plane with the wheel-carrying assembly, one end of said associated member pivotally connected to the downwardly extending portion of the wheel-carrying assembly, the other end of the associated member extending beyond the hinge portion of the wheel-carrying assembly, compensating mechanism connecting said other extending ends of said members, a paw extending from the hinge portion of each wheel-carrying assembly, a compression spring between said paw and the associated member, said paw and compression spring acting to keep the member normally spaced a predetermined distance below the hinge portion of the wheel-carrying assembly, whereby any sudden upward movement of the wheel-carrying assembly will cause said spring to compress and cushion the shock while permitting the member to come closer to the hinge portion of the wheel-carrying assembly.

4. In a vehicle, a mounting for a pair of wheels including, a pair of wheel-carrying assemblies, said assemblies hinged to the vehicle frame for up and down movement, the hinge portions of said wheel-carrying assemblies being in transverse alinement, said wheel-carrying assemblies extending in the same direction, each wheel-carrying assembly having a downwardly extending portion on the opposite end from said hinge portion, an associated member located below each wheel-carrying assembly in the same vertical plane with the wheel-carrying assembly, one end of said associated member connected to the downwardly extending portion of the wheel-carrying assembly, the other end of the member extending beyond the hinge portion of the wheel-carrying assembly, an arcuately formed drum portion at said other end of said member, compensating mechanism connecting said drum portions of said members, a paw extending from the hinge portion of each wheel-carrying assembly, a compression spring between said paw and the associated member, said paw and compression spring acting to keep the member normally spaced a predetermined distance below the hinge portion of the wheel-carrying assembly, whereby upward movement of a wheel-carrying assembly will cause opposite movement in the extending end of its associated member and any sudden upward movement of the wheel-carrying assembly will cause said spring to compress and cushion the shock while permitting the member to come closer to the hinge portion of the wheel-carrying assembly.

5. In a vehicle, a mounting for a pair of wheels including, a pair of wheel-carrying assemblies pivotally mounted at one end on said vehicle for up and down movement, the pivotal mountings of said wheel-carrying assemblies being in transverse alinement, each wheel-carrying assembly having a downwardly extending portion, a resilient member located below each wheel-carrying assembly in the same vertical plane with the wheel-carrying assembly, one end of said resilient member pivotally connected to the downwardly extending portion of the wheel-carrying assembly, the other end of the member extending beyond the pivotal mounting of the wheel-carrying assembly, a cradle for each resilient member extending downwardly from the pivotal mounting of the respective wheel-carrying assembly, compensating mechanism connecting said other ends of said members, whereby upward movement of a wheel-carrying assembly will cause opposite movement of the extending end of its associated resilient member and will cause a downward force to be exerted on the other wheel-carrying assembly.

6. In a running gear assembly, a walking-beam, a pair of wheel-carrying assemblies hinged to said walking-beam for up and down movement, the hinges of said wheel-carrying assemblies being in transverse alinement, said wheel-carrying assemblies extending in the same direction, each wheel-carrying assembly having a downwardly extending portion, an associated member located below each wheel-carrying assembly in the same vertical plane with the wheel-carrying assembly, one end of the associated member connected to the downwardly extending portion of the wheel-carrying assembly, the other end of the member extending beyond the hinge of the wheel-carrying assembly, intermediate means extending from the wheel-carrying assembly to its member, compensating mechanism connecting the other ends of the two associated members, said compensating mechanism carried on said walking-beam, a second pair of similar wheel-carrying assemblies hinged to said walking-beam in longitudinal alinement with the first pair of wheel-carrying assemblies respectively, similar members associated with said second pair of wheel-carrying assemblies, similar compensating mechanism connecting the ends of said second pair of members, said compensating mechanisms mounted on said walking-beam, whereby said walking-beam will distribute the vehicle load between said first and second pairs of wheel-carrying assemblies.

GLENN L. LARISON.